(12) United States Patent
Chung et al.

(10) Patent No.: US 7,190,732 B2
(45) Date of Patent: Mar. 13, 2007

(54) MULTILEVEL CODING WITH UNEQUAL ERROR PROTECTION AND TIME DIVERSITY FOR BANDWIDTH EFFICIENT TRANSMISSION

(75) Inventors: Sae-Young Chung, Waltham, MA (US); Hui-Ling Lou, Murray Hill, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1114 days.

(21) Appl. No.: 09/765,754

(22) Filed: Jan. 19, 2001

(65) Prior Publication Data

US 2001/0028684 A1    Oct. 11, 2001

Related U.S. Application Data

(60) Provisional application No. 60/195,506, filed on Apr. 6, 2000.

(51) Int. Cl.
*H04L 23/02* (2006.01)
*H03M 13/00* (2006.01)

(52) U.S. Cl. .................................... 375/261; 714/755
(58) Field of Classification Search ................ 375/260, 375/261, 262, 265, 286, 295, 316; 714/755, 714/758, 783, 792
See application file for complete search history.

(56) References Cited

U.S. PATENT DOCUMENTS

| | | | |
|---|---|---|---|
| 5,323,424 A | * | 6/1994 | Fazel et al. .................. 375/329 |
| 5,416,801 A | * | 5/1995 | Chouly et al. ............... 375/260 |
| 5,416,804 A | | 5/1995 | Khaled et al. |
| 5,566,193 A | * | 10/1996 | Cloonan ...................... 714/802 |
| 5,671,156 A | * | 9/1997 | Weerackody et al. ......... 714/52 |
| 5,841,378 A | * | 11/1998 | Klayman et al. ............. 341/61 |
| 5,970,098 A | * | 10/1999 | Herzberg .................... 375/264 |

FOREIGN PATENT DOCUMENTS

| | | |
|---|---|---|
| EP | 0 490 552 A2 | 6/1992 |
| EP | 0 610 648 A2 | 8/1994 |

(Continued)

OTHER PUBLICATIONS

1. G.J. Pottie and D.P. Taylor, "Multilevel Codes Based on Partitioning," IEEE Transactions on Information Theory, vol. 35, No. 1, pp. 87-98, Jan. 1989.

(Continued)

*Primary Examiner*—Kevin Kim

(57) ABSTRACT

Techniques for multilevel coding of a stream of information bits in a communication system. The stream of information bits is separated into portions, and each of the portions is associated with a different level of the multilevel coding. At least one code is applied to the portion of the information bits of each level in a designated subset of the full set of levels, such that the portions of the information bits for levels in the designated subset are coded while the portions of the information bits for levels not in the designated subset are uncoded. Both the coded portions of the information bits and the uncoded portions of the information bits are used to select modulation symbols for transmission in the system. Advantageously, the invention provides improved coding gain relative to conventional techniques, and can be configured to provide unequal error protection as well as time diversity for transmissions in the system.

1 Claim, 7 Drawing Sheets

FOREIGN PATENT DOCUMENTS

| | | |
|---|---|---|
| EP | 0 624 018 A1 | 11/1994 |
| EP | 01 30 2770 | 8/2006 |

OTHER PUBLICATIONS

H. Imai and S. Hirakawa, "A New Multilevel Coding Method Using Error-Correcting Codes," IEEE Transactions on Information Theory, vol. IT-23, No. 3, pp. 371-377, May 1997.

E. Husni and P. Sweeney, "Robust Reed Solomon Coded MPSK Modulation," Cryptography and Coding, Lecture Notes in Computer Science, vol. 1355, Springer, pp. 143-154, 1997.

L.-F. Wei, "Coded Modulation with Unequal Error Protection," IEEE Transactions on Communications, vol. 41, No. 10, pp. 1439-1449, Oct. 1993.

G. Ungerboeck, "Trellis-Coded Modulation with Redundant Signal Sets, Part I: Introduction," IEEE Communications Magazine, vol. 25, No. 2, pp. 5-11, Feb. 1987.

G. Ungerboeck, "Trellis-Coded Modulation with Redundant Signal Sets, Part II: State of the Art," IEEE Communications Magazine, vol. 25, No. 2, pp. 12-21, Feb. 1987.

* cited by examiner

US 7,190,732 B2

MULTILEVEL CODING WITH UNEQUAL ERROR PROTECTION AND TIME DIVERSITY FOR BANDWIDTH EFFICIENT TRANSMISSION

PRIORITY CLAIM

The present application claims the benefit of U.S. Provisional Application No. 60/195,506, filed Apr. 6, 2000 and entitled "Multilevel Concatenated Coding with Unequal Error Protection and Time Diversity for Bandwidth Efficient Transmission."

FIELD OF THE INVENTION

The present invention relates generally to digital audio broadcasting (DAB) systems and other types of communication systems, and more particularly to multilevel coding techniques for use in such systems.

BACKGROUND OF THE INVENTION

Hybrid In-Band-On-Channel (IBOC) DAB systems have been developed that broadcast digital audio signals simultaneously with analog Amplitude Modulation (AM) programs in the AM band. Such systems are also referred to as IBOC-AM systems. In these systems, both the power and bandwidth allocated for digital audio transmission are extremely limited. As a result, these systems are generally unable to add enough redundancy for error control using conventional concatenated coding techniques. However, it is well known that the decoded audio quality can be improved in the presence of transmission errors through the use of an error mitigation and concealment algorithm in the audio decoder. Effective utilization of such an error mitigation and concealment algorithm generally requires error flags that indicate the quality of the channel decoded bit stream. These error flags can be generated using block codes such as Reed Solomon (RS) codes.

FIG. 1 shows a simplified block diagram of a transmitter portion of a conventional IBOC-AM system 100. The system 100 includes an audio coder 102, a block encoder 104, and a modulator 106. An audio signal is applied to the audio encoder 102 and the resulting compressed audio bit stream is applied to a block encoder 104 which may be an RS encoder. The output RS code symbols from the encoder 104 are mapped in the modulator 106 to modulation symbols, e.g., symbols of a Quadrature Amplitude Modulation (QAM) signal set. The resulting modulation symbols are transmitted over an additive noise channel 108 to a receiver (not shown).

Conventional techniques involving mapping of RS-coded symbols directly to QAM symbols in a system such as that shown in FIG. 1 typically use RS codes based on a Galois field $GF(2^m)$ if the modulation is $2^m$-QAM. Thus, each m-bit symbol can map directly into an m-bit QAM symbol. However, this limits the choice of RS codes one can apply and thus may affect the error-correction capability. For example, if 32-QAM modulation is used, a perfectly-matched RS code will be based on $GF(2^5)$. For a given coding rate of 0.8, an RS code of (30, 24) can be applied to match the resulting 5-bit RS code symbols to the 5-bit QAM symbols. Since longer block codes provide more powerful error protection, it may be desirable to use a (60, 48) RS code based on $GF(2^6)$ because it can correct twice as many random errors as the (30, 24) code. However, this will result in a mismatch between the 6-bit RS code symbols and the 5-bit QAM symbols.

Multilevel coding is a well-known technique for addressing the above-described mismatch problem. Instead of applying an RS code or other block code to the data bits and then mapping the resulting code symbols into an m-bit modulation symbol as shown in FIG. 1, multilevel coding is a joint coding-modulation technique that applies a different single or concatenated code of appropriate rate to each bit of a given m-bit modulation symbol. Examples of multilevel coding are described in G. J. Pottie and D. P. Taylor, "Multilevel Codes Based on Partitioning," IEEE Transactions on Information Theory, Vol. 35, No. 1, pp. 87–98, January 1989, H. Imai and S. Hirakawa, "A New Multilevel Coding Method Using Error-Correcting Codes," IEEE Transactions on Information Theory, Vol. IT-23, No. 3, pp. 371–377, May 1997, and E. Husni and P. Sweeney, "Robust Reed Solomon Coded MPSK Modulation," Cryptography and Coding, Lecture Notes in Computer Science, Vol. 1355, Springer, pp. 143–154, 1997. The latter reference describes a technique which uses RS codes as component codes for multilevel coding combined with M-ary Phase Shift Keying (MPSK) modulation in place of the above-noted QAM modulation.

A significant problem with existing multilevel coding techniques such as those described in the above-cited references is that these techniques fail to provide optimal performance in IBOC-AM DAB systems and other important bandwidth-limited communication system applications. A need therefore exists in the art for improved multilevel coding techniques.

SUMMARY OF THE INVENTION

The present invention provides improved techniques for multilevel coding in a communication system.

In accordance with one aspect of the invention, a stream of source-coded information bits is separated into portions, and each of the portions is associated with a different level of the multilevel coding. At least one code is applied to the portion of the information bits of each level in a designated subset of the full set of levels, such that the portions of the information bits for levels in the designated subset are coded while the portions of the information bits for levels not in the designated subset are uncoded. The code applied to a given level may be, e.g., a block code such as a Reed-Solomon (RS) code, an RS code concatenated with a convolutional code, or other suitable single or concatenated code. Both the coded portions of the information bits and the uncoded portions of the information bits are used to select modulation symbols for transmission in the system. For example, in an illustrative embodiment of the invention, there may be a total of m levels, with less than m of the levels coded, and the modulation symbols being selected from a signal set of a $2^m$ modulation constellation.

In accordance with another aspect of the invention, the m levels are arranged from a lowest level to a highest level, and the designated subset of levels includes at least the lowest level. More particularly, the designated subset includes a series of $i_{max}$ adjacent levels beginning with the lowest level, where $i_{max}$ is greater than or equal to one but less than m. The portion of the information bits for each of the levels of the designated subset has at least a block code applied thereto. The block codes applied to the portions of the information bits for the series of $i_{max}$ adjacent levels beginning with the lowest level are selected so as to have increasing code rates from a lowest code rate for the block code associated with the lowest level to a highest code rate for the block code associated with the highest of the levels in the series of $i_{max}$ adjacent levels.

In accordance with a further aspect of the invention, each of the lowest levels $j=1, \ldots, j_{max}$ may include a block code concatenated with a convolutional code, where $j_{max}$ is greater than or equal to one but less than or equal to $i_{max}$.

Advantageously, the multilevel coding techniques of the present invention provide significant coding gain and thus improved performance in terms of bit error rate (BER) relative to conventional techniques. In addition, the multilevel coding techniques of the invention can be used to implement unequal error protection and/or time diversity. Moreover, through the use of block codes, the invention ensures that error flags are available for error mitigation and/or concealment in a source decoder.

The invention can be applied to any type of digital information, including, for example, audio, speech, video and image information, as well as various combinations thereof. In addition, the invention may be implemented in numerous communication system applications, including AM and FM IBOC DAB systems, Internet and satellite broadcasting systems, etc.

DETAILED DESCRIPTION OF THE INVENTION

The present invention will be illustrated herein using example communication systems particularly well-suited for use in hybrid In-Band On-Channel (IBOC) communication systems operating in the AM band. It should be understood, however, that the invention is more generally applicable to any communication system application in which multilevel coding techniques may be advantageously applied. For example, the invention may be implemented in hybrid IBOC systems operating in the FM band, all-digital DAB systems, Internet-Based and satellite-based broadcasting systems, etc.

Figure 2:
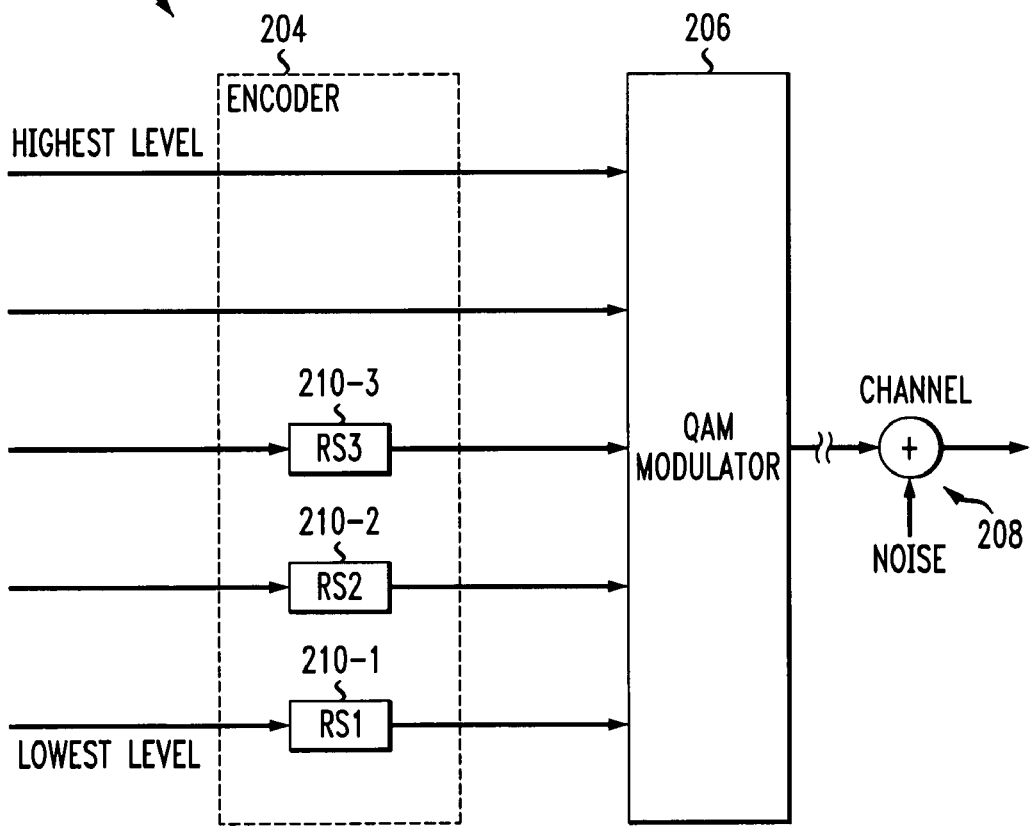
FIG. 2 is a simplified block diagram of a transmitter portion of a communication system in accordance with an illustrative embodiment of the invention.

FIG. 2 shows a simplified block diagram of a transmitter portion of a communication system 200 in accordance with a first illustrative embodiment of the invention. This embodiment uses multilevel coding in which a different RS code is applied to each level in a designated subset of a given set of levels. The portion of the communication system 200 shown in the figure includes an encoder 204, a 32-Quadrature Amplitude Modulation (QAM) modulator 206, and an additive noise channel 208.

Although the embodiment of FIG. 2 and other illustrative embodiments described herein utilize 32-QAM modulators, this is by way of example only. The invention is more generally applicable for use with any type of modulation that may be used in conjunction with the multilevel coding techniques described herein, including, e.g., $2^m$-QAM or M-ary Phase Shift Keying (MPSK) modulation. The embodiments described herein are examples of implementations involving $2^m$-QAM in which the value of m is selected as 5 for purposes of illustration only. Those skilled in the art will recognize that the invention does not require the use of any particular value of m.

Figure 1:
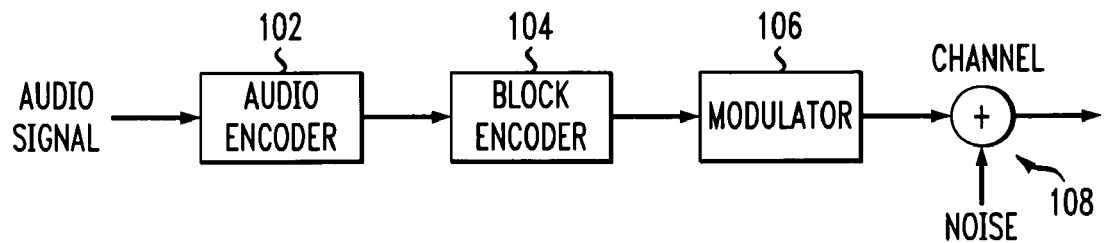
FIG. 1 is a simplified block diagram of a transmitter portion of a conventional communication system.

The encoder 204 encodes a sequence of bits, typically source-coded bits received from a source coder. More particularly, the encoder 204 in this embodiment receives a set of m=5 input bits from a serial-to-parallel converter (not shown) which may be part of or otherwise associated with a source encoder such as audio encoder 102 of FIG. 1. Each of the m=5 bits corresponds to a particular coding level of an m-bit multilevel coding technique of the present invention. The lowest level corresponds to a first bit of the given set of m bits, and the highest level corresponds to an mth bit of the given set of m bits.

In accordance with the invention, each of the bits in a designated subset of the m bits, beginning with the lowest level bit, has a corresponding RS code applied thereto in a coder element 210-$i$, where $i=1, \ldots, i_{max}$ and $i_{max}$ is greater than or equal to one but less than m. For example, in the embodiment shown in FIG. 2, in which m is equal to five, $i_{max}$ is equal to three, such that there are a total of five levels, two of which are uncoded levels and three of which are coded levels. In another example embodiment where m is equal to five, $i_{max}$ may be equal to two, such that there are a total of five levels, three of which are uncoded levels and two of which are coded levels, or $i_{max}$ may be equal to four, such that there are a total of five levels, one of which is an uncoded level and four of which are coded levels. In yet another example embodiment, m may be equal to 4, and 16-QAM modulation may be used, with $i_{max}$ equal to two, such that there are a total of four levels, two of which are uncoded levels and two of which are coded levels. As another example m=4 embodiment, $i_{max}$ may be equal to three, such that there are a total of four levels, one of which is an uncoded level and three of which are coded levels.

Referring again to the illustrative embodiment of FIG. 2, where m=5 and $i_{max}=3$, a first RS code RS1 is applied to the lowest level bit, i.e., bit 1, in a first coder element 210-1, a second RS code RS2 is applied to the next highest bit, i.e., bit 2, in a second coder element 210-2, and a third RS code RS3 is applied to bit 3 in a third coder element 210-3. The fourth and fifth bits in the set of m=5 bits are left uncoded in the encoder 204.

The 32-QAM modulator 206 receives as inputs the m=5 outputs of the encoder 204 and generates an 5-bit modulation symbol selected from a 32-QAM constellation. The resulting modulation symbols may be directly transmitted over the channel 208, or further processed in a conventional manner using well-known techniques such as upconversion, filtering, amplification, etc. prior to transmission over the channel 208.

The mapping of input bits to QAM symbols in QAM modulator 206 is implemented using set partitioning as described in G. Ungerboeck, "Trellis-Coded Modulation with Redundant Signal Sets, Part I. Introduction," IEEE Communications Magazine, Vol. 25, No. 2, pp. 4–11, February 1987, and G. Ungerboeck, "Trellis-Coded Modulation with Redundant Signal Sets, Part II: State of the Art," IEEE Communications Magazine, Vol.25, No.2, pp. 12–21, February 1987, both of which are incorporated by reference herein.

Figure 3:
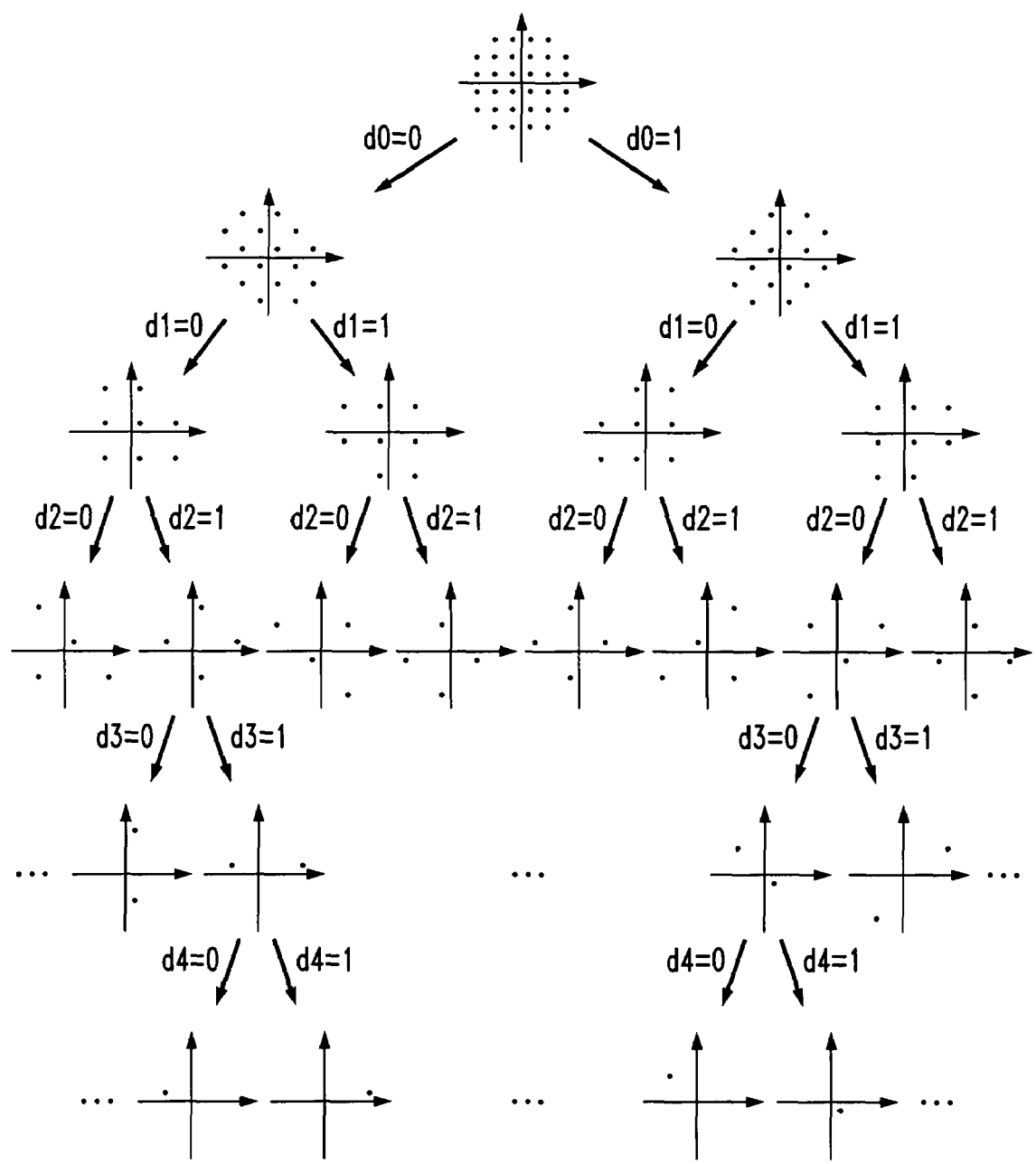
FIG. 3 illustrates the partitioning of a 32-QAM signal set implemented in a QAM modulator of the FIG. 2 embodiment.

FIG. 3 shows in greater detail an example partitioning of the 32-QAM signal set that may be implemented in the QAM modulator 206 of FIG. 2. The figure illustrates the manner in which a given symbol or constellation point is selected based on the values of the m=5 input bits supplied to the modulator for a given modulation symbol generation interval. In the figure, the 5 input bits are denoted $d_0$, $d_1$, $d_2$, $d_3$ and $d_4$. The lowest bit $d_0$ is first used to choose one of two subsets of the 32-QAM points, and then the rest of the bits $d_1$, $d_2$, $d_3$ and $d_4$ are used to select the appropriate subsets from their corresponding parent sets.

Decoding of received QAM symbols is performed in the following manner. First, the lowest level is decoded using an RS decoder corresponding to the code RS1, and the resulting corrected sequence is used in the decoding of the next higher level. The decoding continues in an iterative manner until all of the levels have been decoded.

Many different implementations of the illustrative embodiment of FIG. 2 are possible. For example, the embodiment may be implemented using RS codes over $GF(2^6)$, with the RS1 code, the RS2 code and the RS3 code corresponding to a (60,12) RS code, a (60,50) RS code and a (60,58) RS code, respectively. As another example, the embodiment may be implemented using RS codes over $GF(2^8)$, with the RS1 code, the RS2 code and the RS3 code corresponding to a (100,16) RS code, a (100,86) RS code and a (100,98) RS code, respectively. Both of these example implementations provide a substantial coding gain relative to uncoded 16-QAM. More specifically, simulations have shown that at a bit error rate (BER) of $10^{-5}$, the above-noted $GF(2^6)$ codes provide a gain of about 2.3 dB, and the above-noted $GF(2^8)$ codes provide a gain of about 2.5 dB. Numerous alternative implementations will be apparent to those skilled in the art.

In general, suitable code rates for the FIG. 2 embodiment may be selected as follows. With a total of m=5 levels, a lowest one of the five levels may be configured so as to have a code rate approximately in a range of about 0.2 to 0.3, the next highest one of the levels may be configured so as to have a code rate approximately in a range of about 0.8 to 0.9, and the next highest one of the levels may be configured so as to have a code rate greater than about 0.9. It should be noted that a code rate of 1.0 corresponds to no coding, e.g., a level that passes directly to the QAM modulator in the FIG. 2 embodiment. A level with a code rate greater than about 0.9 may therefore be an uncoded level.

For an embodiment with a total of m=4 levels, a lowest one of the four levels may be configured so as to have a code rate approximately in a range of about 0.2 to 0.3, and the next two highest levels may be configured so as to have code rates higher than about 0.9 and 0.95, respectively. Again, an uncoded level has a code rate of 1.0, so a level having a code rate greater than about 0.9 or 0.95 may be an uncoded level.

Figure 4:
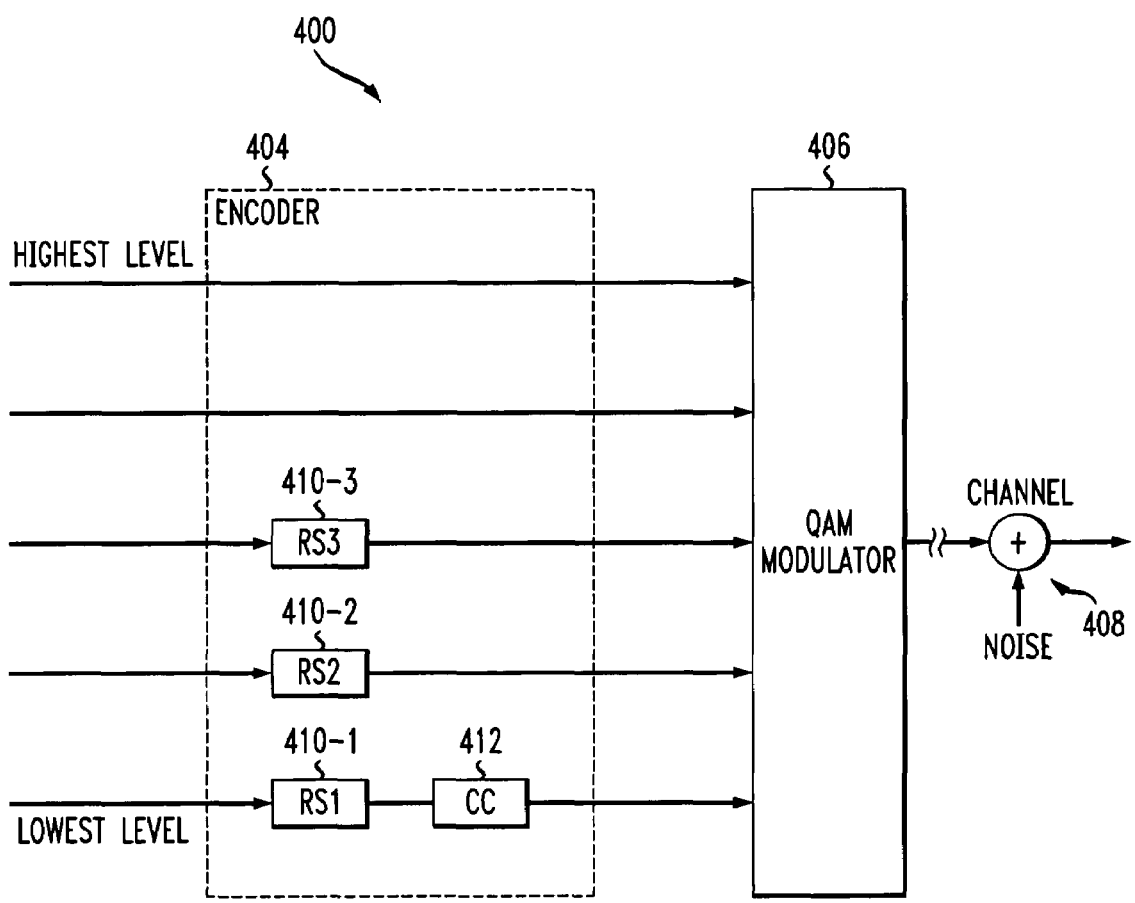
FIGS. 4, 5, 6 and 7 show simplified block diagrams of transmitter portions of communication systems in accordance with other illustrative embodiments of the invention.

FIG. 4 shows a simplified block diagram of a transmitter portion of a communication system 400 in accordance with a second illustrative embodiment of the invention. This embodiment is an example of multilevel concatenated coding in accordance with the invention in which a different RS code is applied to each level in a designated subset of a given set of levels, and the RS code at one or more of the lowest levels is concatenated with a convolutional code. In this specific embodiment, only the RS code at the lowest level is concatenated with a convolutional code. The portion of the communication system 400 shown in the figure includes an encoder 404, a 32-QAM modulator 406, and an additive noise channel 408. Again, the value of m=5 is selected for illustrative purposes only, and other values may be used.

The configuration of the encoder 404 and QAM modulator 406 is substantially as described in conjunction with the embodiment of FIG. 2. Like the encoder 204 of FIG. 2, the encoder 404 includes three RS coder elements, designated 410-1, 410-2 and 410-3 in this embodiment, which apply respective RS codes RS1, RS2 and RS3 to the three lowest level input bits, and the two highest level input bits pass uncoded to the modulator 406. However, the encoder 404 further includes a convolutional coder 412 having an input coupled to an output of the coder element 410-1. The convolutional code used by coder 412 represents an inner code for the lowest level, while the RS code RS1 provides an outer code for the lowest level. This allows soft-decision Viterbi decoding to be used for the inner code, thereby providing additional coding gain. The mapping of input bits to QAM symbols in QAM modulator 406 is again implemented using the above-described Ungerboeck set partitioning.

Although a concatenated RS code and convolutional code are used only for the lowest level in the FIG. 4 embodiment, this is by way of example and not limitation. More generally, each of a plurality of lowest levels j=1, ... $j_{max}$ may include concatenated RS and convolutional codes, where $j_{max}$ is less than or equal to $i_{max}$, i.e., the number of levels with RS codes.

Example implementations for the FIG. 4 embodiment are as follows. A first example uses a rate-½ four-state convolutional code for convolutional coder 412, and RS codes over $GF(2^8)$, with the RS1 code, the RS2 code and the RS3 code corresponding to a (50,16) RS code, a (100,86) RS code and a (100,98) RS code, respectively. A second example uses the same rate-½ four-state convolutional code, and RS codes over $GF(2^8)$, but with the RS1 code, the RS2 code and the RS3 code corresponding to a (50,28) RS code, a (100,74) RS code and a (100,98) RS code, respectively. Both of these example implementations provide a substantial coding gain relative to uncoded 16-QAM. More specifically, simulations have shown that at a bit error rate (BER) of $10^{-5}$, the codes in the first example given above provide a gain of about 2.6 dB, and the codes in the second example provide a gain of about 3.4 dB. Again, numerous alternative implementations will be apparent to those skilled in the art.

One example of an alternative implementation of the FIG. 4 embodiment may have m=5 but with only the two lowest levels RS coded, and with the lowest level using concatenated RS and convolutional codes. The RS codes may be over $GF(2^5)$, with the RS1 code and the RS2 code corresponding to a (15,6) RS code and a (30,24) RS code, respectively. The RS3 code is not used in this implementation, and the corresponding level passes uncoded to the modulator. Simulations indicate that this alternative implementation provides a coding gain of about 2.5 dB at a BER of $10^{-5}$, relative to uncoded 16-QAM.

The embodiments described above in conjunction with FIG. 4 are based on a determination that for bandwidth-limited channels requiring high-rate coding, e.g., an overall code rate on the order of 0.8, it is desirable to apply the convolutional code to the lowest level bits only. However, as previously noted, concatenated RS-convolutional codes may be used for one or more additional levels as well as the lowest level.

Simulations indicate that increasing the complexity of the convolutional code used in coder 412 may not appreciably improve the performance. Therefore, in applications in which it is desirable to minimize the code complexity, the above-noted 4-state code may be preferred to convolutional codes with a greater number of states, e.g., 16, 64 or 256 states.

It should be noted that the multilevel encoder-modulator pairs 204-206 of FIG. 2 and 404-406 of FIG. 4 can be jointly optimized for source content as well as or in place of being jointly optimized for coding gain as in the above examples.

Figure 5:
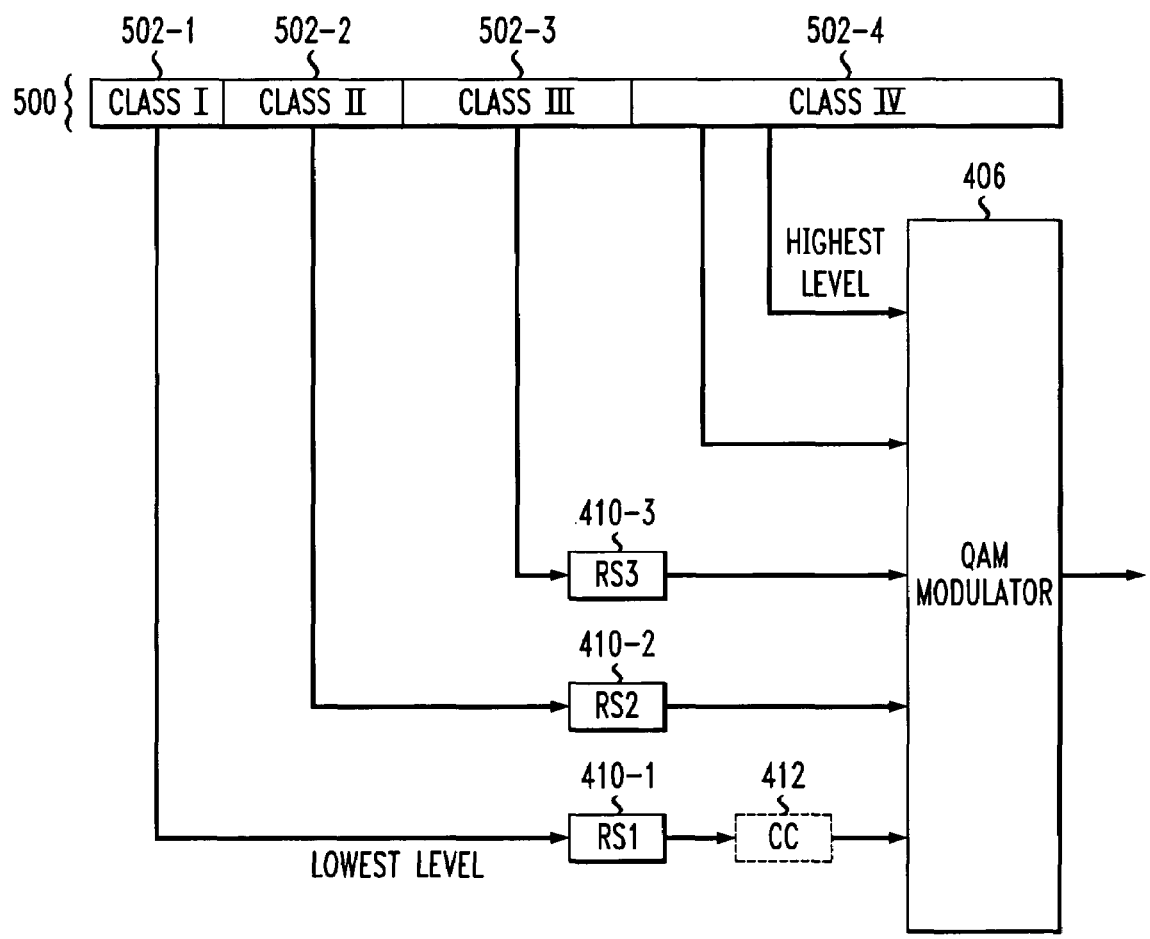

FIG. 5 shows the manner in which the illustrative embodiment of FIG. 4 can be utilized to provide unequal error protection. In this figure, a given frame 500 of source-coded bits includes four different classes of bits, i.e., Class I, Class II, Class III and Class IV, denoted 502-1, 502-2, 502-3 and 502-4, respectively. The different classes of bits have different levels of importance, i.e., the Class I bits are the most important bits of the frame 500 and the Class IV bits are the least important bits of the frame 500. The Class I bits are coded using the concatenated RS-convolutional codes provides by RS coder element 410-1 and convolutional coder 412. The Class II and Class III bits are coded using the RS coder elements 410-2 and 410-3, respectively. The Class IV bits correspond to the highest two levels of the multilevel coding process, and are passed uncoded to the QAM modulator 406. The RS1 code used in coder element 410-1 is designed to ensure that the Class I bits have a greater amount of error protection than the bits of all of the other levels. Similarly, the RS2 code used in coder element 410-2 is designed to ensure that the Class II bits have a greater amount of error protection than the Class III bits, and the RS3 code used in coder element 410-3 is designed to ensure that the Class III bits have a greater amount of error protection than the Class IV bits.

A significant advantage of the unequal error protection arrangement illustrated in FIG. 5 is that each of Classes I, II and III can have error flags of different detection capability, thereby facilitating error mitigation and/or concealment in the source decoder.

Figure 6:
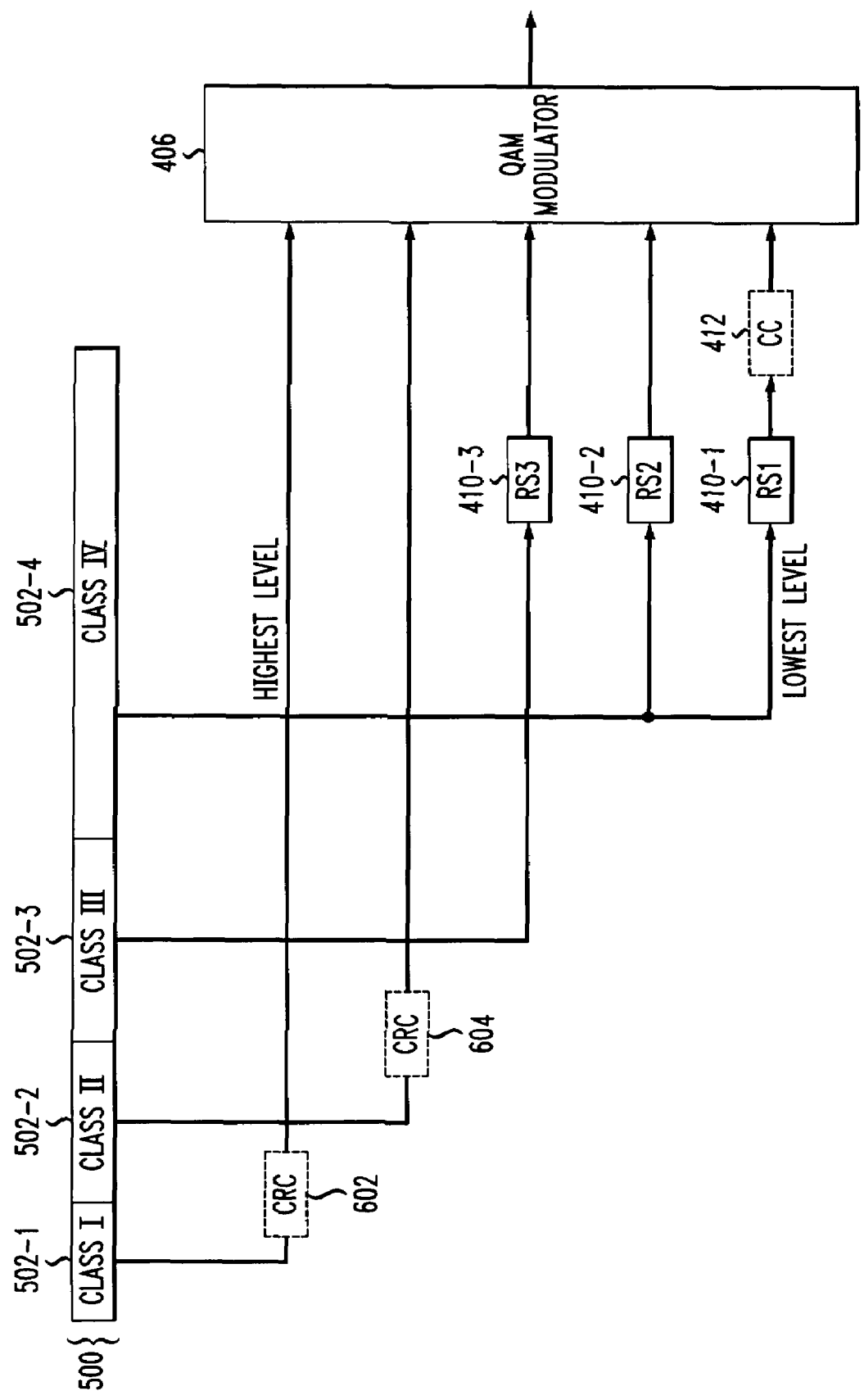

FIG. 6 shows another illustrative embodiment of the invention which implements unequal error protection for the source-coded frame 500. In this embodiment, which includes coder elements 410-1, 410-2 and 410-3 and QAM modulator 406, the multilevel code is configured such that the highest level is more reliable than that of the lower levels. This may be a feature of the particular multilevel code used, and the rates of the RS1, RS2 and RS3 codes used in respective coder elements 410-1, 410-2 and 410-3 may be fixed to implement this feature. The least important bits, i.e., the Class IV bits, are therefore mapped to the two lowest levels, and processed using the RS 1 and RS2 codes. The Class III bits are processed using the RS3 code. The most important bits, i.e., the Class I and Class II bits, are coded using Cyclic Redundancy Check (CRC) coders 602 and 604, respectively. This arrangement ensures that error flags can be generated for the Class I and Class II bits and used for error mitigation and/or concealment in the source decoder. The RS1, RS2 and RS3 codes allow error flags to be generated for the other classes of bits. The CRC coders 602, 604 are shown in dashed outline because such coders may be eliminated if error flags are not required for the Class I and Class II bits.

The arrangements shown in FIGS. 5 and 6 are by way of example only. In an alternative configuration, the convolutional coder 412, which is shown in dashed outline in FIGS. 5 and 6, may be eliminated, such that the unequal error protection is provided using substantially the non-concatenated multilevel coding embodiment of FIG. 2. In addition, the particular number, type and other characteristics of the classes of bits will generally vary depending upon the particular coding application. The particular mapping of the classes of bits to the levels of the multilevel coding technique will also depend on the amount of error detection and correction capability required by each of the classes.

Figure 7:
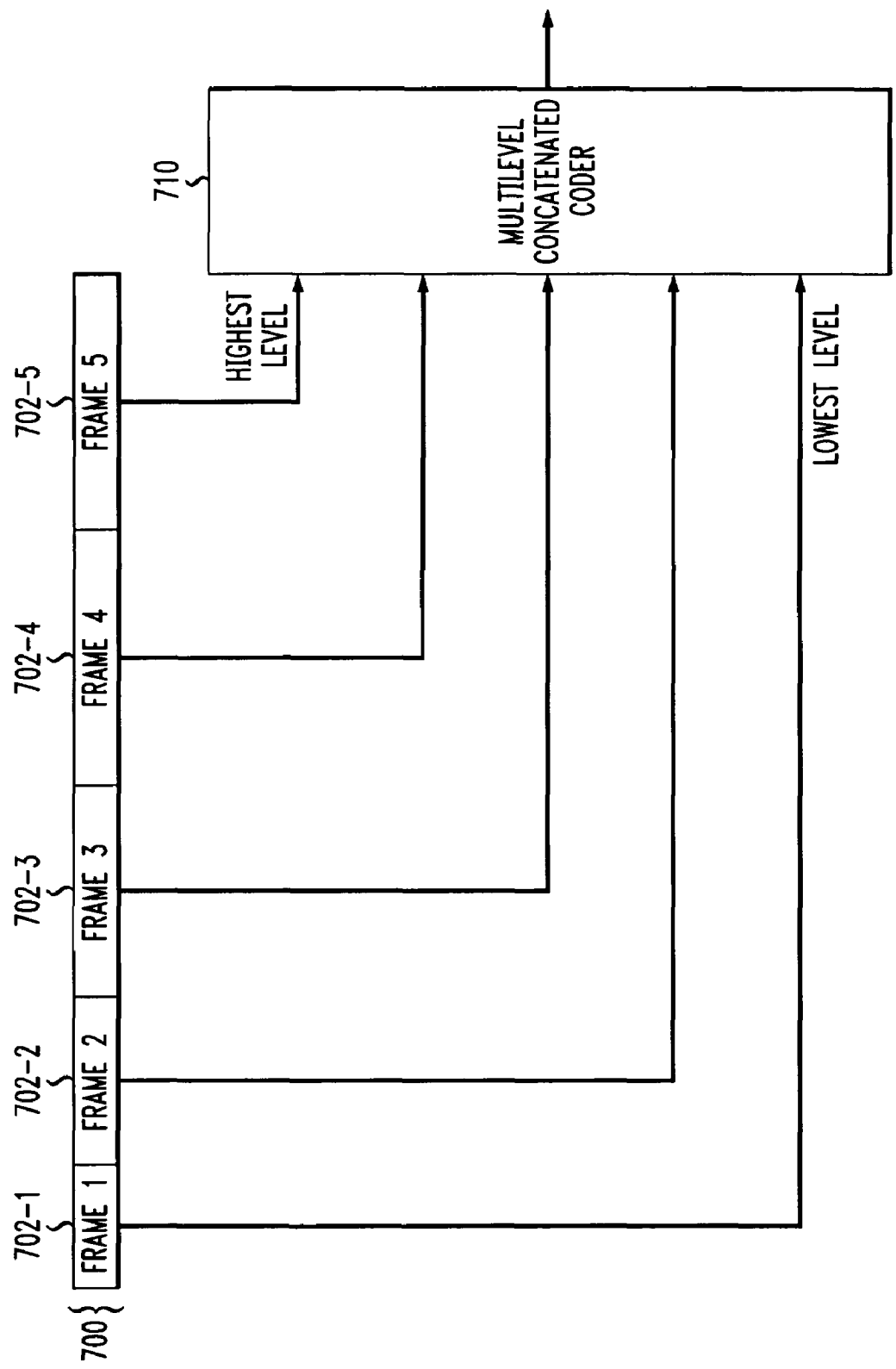

FIG. 7 illustrates the manner in which the multilevel coding techniques of the present invention may be used to provide time diversity in a communication system. In this embodiment, a set of source frames 700 includes five frames, Frame 1, Frame 2, Frame 3, Frame 4 and Frame 5, also denoted in the figure as frames 702-1, 702-2, 702-3, 702-4 and 702-5, respectively. Time diversity is desirable in order to alleviate the effects of bursts of errors that may occur in the transmission channel. For example, in the embodiments of FIGS. 5 and 6, if a burst of errors occurs, the entire frame 500 may be received in error. Such error bursts can be problematic in that if the frame size is large, the source decoder may be unable to mitigate or conceal the error. By providing time diversity, the effect of a given burst of errors is spread over multiple frames. With reference to FIG. 7, this may be achieved by mapping the frames 702-1, 702-2, 702-3, 702-4 and 702-5 to different levels of a multilevel code of the present invention. The frame 702-1 is the shortest frame in the set 700, followed in length by frame 702-2, while frames 702-3, 702-4 and 702-5 represent longer frames. Since different coded levels in a multilevel code typically have different code rates associated therewith, each coded level carries a different amount of information bits for a fixed number of transmitted symbols. In other words, each level can carry a different number of source-coded bits. Thus, source-coded frames with fewer bits can be sent through the lower levels and larger frames can be sent through the higher levels.

More particularly, the multilevel code in this embodiment is implemented using a multilevel concatenated coder 710, which may represent, e.g., the encoder 404 and modulator 406 of FIG. 4. The shortest frame 702-1 is mapped to the lowest level, the next shortest frame 702-2 is mapped to the next higher level, and the longer frames 702-3, 702-4 and 702-5 are mapped to the next highest level. The operation of the multilevel concatenated coder 710 may be as previously described in conjunction with FIG. 4. In other embodiments, a multilevel non-concatenated coder such as that shown in FIG. 2 may be used.

The provision of time diversity in the manner illustrated in FIG. 7 may introduce additional delay, since different source-coded frames are multiplexed prior to transmission. However, this additional delay is generally not a problem in DAB systems, such as IBOC-AM and IBOC-FM systems.

It should be noted that the unequal error protection techniques illustrated in FIGS. 5 and 6 can be combined with the time diversity techniques illustrated in FIG. 7 in a given embodiment of the invention. For example, each of the frames 702 in the set of frames 700 in FIG. 7 may be separated into different classes of bits as shown in FIGS. 5 and 6. The Class I bits from each of the frames 702 can then be multiplexed into the level that provides the greatest amount of error protection, with the Class IV bits from each of the frames 702 multiplexed into the level that provides the least amount of error protection. The intermediate classes of bits are similarly multiplexed into appropriate levels.

As previously noted, the multilevel coding embodiments described herein may include additional elements commonly used in communication systems, including interleavers and deinterleavers, upconverters and downconverters, filters, amplifiers, etc. Given the multilevel coding techniques described herein, those skilled in the art will be able, in a straightforward manner, to configure appropriate arrangements of receiver elements capable of performing complementary operations for decoding received multilevel coded symbols. One example of such an arrangement of receiver elements is described below.

Figure 8:
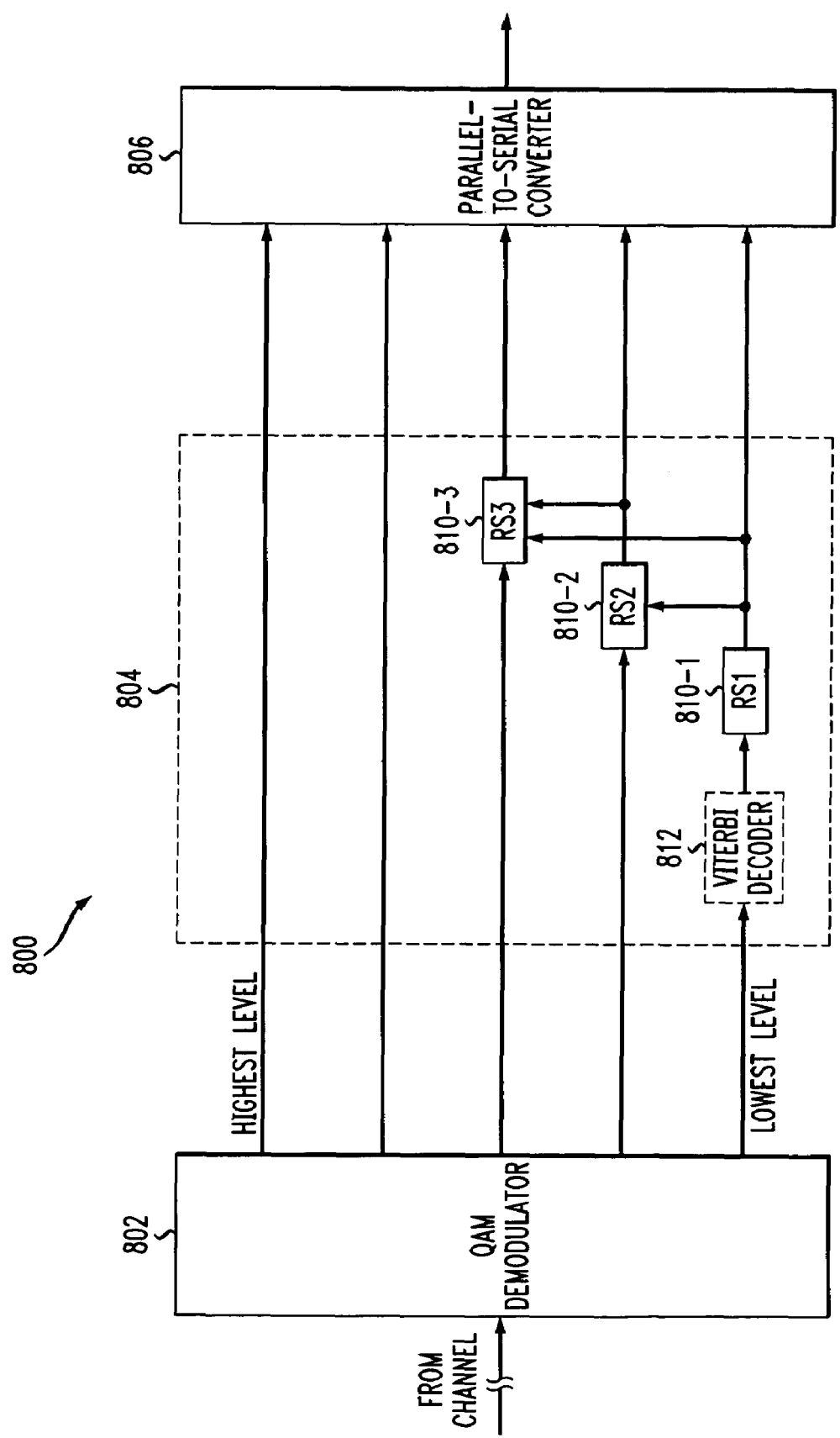
FIG. 8 is a simplified block diagram of a receiver portion of a communication system suitable for use with the transmitter portions of FIGS. 2 and 4 in accordance with another illustrative embodiment of the invention.

FIG. 8 shows an example of a receiver portion 800 of a communication system in accordance with the invention. The receiver portion 800 may be used in the communication system 200 of FIG. 2 or the communication system 400 of FIG. 4. The receiver portion 800 in this illustrative embodiment includes a QAM demodulator 802, a multilevel decoder 804, and a parallel-to-serial converter 806. Input QAM symbols received from the channel 208 or 408 are demodulated in the QAM demodulator 802 and the resulting outputs are applied to the decoder 804. The bits corresponding to the two highest levels are passed directly to the parallel-to-serial converter 806. The bits of the three lowest levels are processed in RS decoder elements 810-1, 810-2 and 810-3, respectively. These decoder elements 810-1, 810-2 and 810-3 perform decoding operations complementary to the coding operations performed in RS coder elements 210-1, 210-2 and 210-3, respectively, of FIG. 2 or RS coder elements 410-1, 410-2 and 410-3, respectively, of FIG. 4. In the multilevel decoder 804, the output of the decoder element 810-1 is also applied to the decoder elements 810-2 and 810-3, and the output of the decoder element 810-2 is also applied to the decoder element 810-3. The lowest level of the multilevel decoder 804 further includes a Viterbi decoder 812 that is used to decode the convolutional code of convolutional coder 412 of FIG. 4. The Viterbi decoder 812 is shown in dashed outline because it is not used when the receiver portion 800 is used with the transmitter portion of FIG. 2.

The embodiments shown in FIGS. 2 and 4–8 may be implemented using conventional processing hardware and associated software elements. Such processing hardware may include suitably-programmed microprocessors, digital signal processors (DSPs), application-specific integrated circuits (ASICs), or portions or combinations of these and other well-known devices. The invention can be implemented at least in part in software stored in a memory associated with one or more of the above-noted devices.

The invention in the illustrative embodiments described above provides multilevel coding techniques particularly well-suited for use in conjunction with high-rate channel coding of source-coded information bits, e.g., compressed audio bits generated by an audio coder such as a PAC encoder, for transmission over a bandwidth-limited communication channel of an IBOC-AM or IBOC-FM DAB system. It should be emphasized that the multilevel coding techniques of the invention may be applied to many other types of source-coded information, e.g., source-coded speech, image or video information. In addition, the invention may be implemented using codes other than the RS, convolutional and CRC codes used in the illustrative embodiments. For example, the RS codes may be replaced with other types of well-known block codes, the convolutional codes may be replaced with turbo codes, etc. Furthermore, the invention may be utilized in a wide variety of different types of communication system applications, including communications over the Internet and other computer networks, and over cellular multimedia, satellite, wireless cable, wireless local loop, high-speed wireless access and other types of communication systems. The invention may be utilized with any desired type of communication channel or channels, such as, for example, frequency channels, time slots, code division multiple access (CDMA) slots, and virtual connections in asynchronous transfer mode (ATM) or other packet-based transmission systems. These and numerous other alternative embodiments and implementations within the scope of the following claims will be apparent to those skilled in the art.

What is claimed is:

1. A method for multilevel coding of a stream of information bits in a communication system, the method comprising the steps of:

separating the stream of information bits into a plurality of different portions;

associating each of the portions of the information bits with one of a plurality of levels;

applying at least one code to the portion of the information bits of each level in a designated subset of the plurality of levels, such that the portions of the information bits for one or more levels in the designated subset are coded while the portions of the information bits for one or more levels not in the designated subset are uncoded; and utilizing both the coded portions of the information bits and the uncoded portions of the information bits to select modulation symbols for transmission in the system;

wherein the stream of information bits comprises a plurality of frames of information bits, and each of the portions of the stream of information bits comprises at least a part of each of the plurality of frames, the particular part of a given one of the frames corresponding to one of the portions including a plurality of contiguous bits of the given frame associated with a class of bits to be provided with a designated amount of error protection.

* * * * *